(No Model.)

J. TREGONING.
SELF OILING BOX OR JOURNAL.

No. 421,991. Patented Feb. 25, 1890.

Witnesses:

Inventor:
John Tregoning
By H. C. Townsend
Attorney.

UNITED STATES PATENT OFFICE.

JOHN TREGONING, OF LYNN, MASSACHUSETTS.

SELF-OILING BOX OR JOURNAL.

SPECIFICATION forming part of Letters Patent No. 421,991, dated February 25, 1890.

Application filed November 4, 1889. Serial No. 329,170. (No model.)

*To all whom it may concern:*

Be it known that I, JOHN TREGONING, a citizen of the United States, and a resident of Lynn, in the county of Essex and State of Massachusetts, have invented a certain new and useful Self-Oiling Box or Journal, of which the following is a specification.

My invention relates to the construction of journal boxes and bearings.

The object of the invention is to so construct the box and bearings as to facilitate the work of renewal of the brasses or bearings, to prevent end play of said bearings, and to perfect the lubrication.

To these ends my invention consists in the special details of construction and combinations of parts, hereinafter described in connection with the accompanying drawings, in which—

Figure 1:
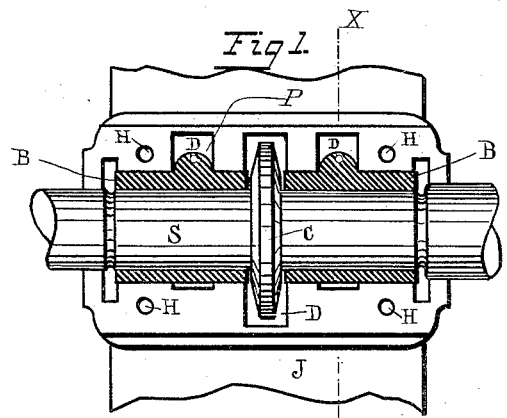
Figure 2:
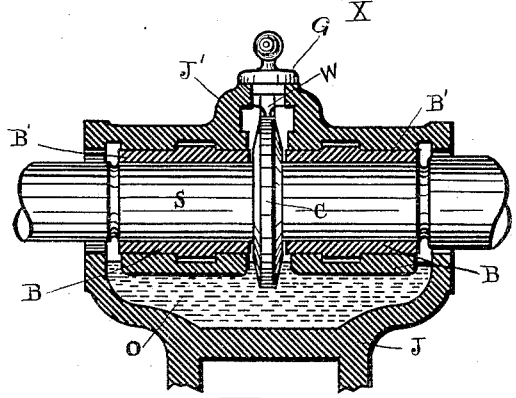
Figure 3:
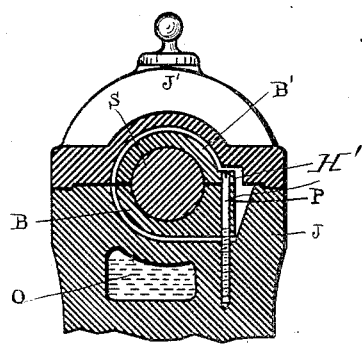
Figure 4:
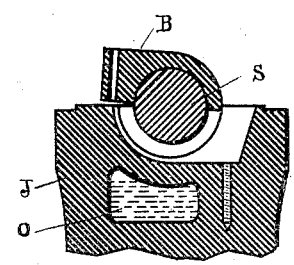

Figure 1 is a plan of a journal-box embodying my invention, the cap or cover and the top bearing being removed. Fig. 2 is a longitudinal vertical section of the journal box and bearing, the shaft or bearing being shown in side elevation. Fig. 3 is a vertical cross-section on the line X X, Fig. 1. Fig. 4 illustrates the manner of removing the lower brass or bearing.

J indicates a journal-box or pillow-block of any suitable form, provided with an oil-reservoir O and with the usual cap or cover J', which may be fastened down by means of bolts or screws entering the holes H H.

S is the journal, provided with a collar C of any suitable material, which may be either turned up upon the journal or be a ring forced on or secured to the journal or formed thereon in any desired manner. The ring or washer C rotates in the oil of the reservoir O.

W is a wiper carried by the cover-plate or other suitable support and resting upon the collar C, so as to catch and distribute the oil raised by the collar when revolving in the oil. The wiper W may be of any suitable material and supported in any desired manner—as, for instance, by a button or support G, resting on the top of the cap J' and extending through an opening in the top of the same. By removing the button or support G the wiper may be renewed without detaching the cap J'.

B B' are the journal bearings or brasses, and D D are notches or cavities in the journal-box or pillow-block, with which projections from the journal bearings or brasses engage, so as to prevent lateral motion. The two sections of the journal-bearings B B' are united on a horizontal line by means of a pin P, which holds them together and to the journal-box or pillow-block by extending down into the latter, as clearly shown in Fig. 3. The pin P is preferably applied through the lugs or extensions H', that engage in the notches D, as shown more clearly in Fig. 1. The pin P not only assists in preventing lateral motion, but also acts as a set-pin for the bearings or brasses, and prevents them from rotating with the shaft by holding them in fixed position, so that the shaft may turn in said brasses or bearings in the ordinary manner.

To remove the lower box or brass B, the cap J' is taken off and the pin P and upper half of the box B' detached, after which the lower half brass or bearing can be rotated by the journal into the position shown in Fig. 4 or until it is free. The notches or recesses D also permit the insertion of a tool or finger for the purpose of taking hold of the lower journal bearing or brass in this operation.

What I claim as my invention is—

1. The combination, with the journal-box having notches, of the fixed journal bearings or brasses provided with lugs or projections adapted to enter said notches.

2. The combination, with the upper and lower bearings or fixed brasses, of a fastening-pin P, holding the same together and engaging with the journal-box or pillow-block, as and for the purpose described.

3. In a journal-box having a removable cap J', a brass or bearing B, having a lateral projection which enters an opening D in the journal-box or pillow-block, as and for the purpose described.

Signed at Lynn, in the county of Essex and State of Massachusetts, this 30th day of October, A. D. 1889.

JOHN TREGONING.

Witnesses:
J. WESLEY GIBBONEY,
OTIS K. STUART.